Patented Mar. 11, 1930

1,750,561

UNITED STATES PATENT OFFICE

OSCAR ADLER AND RUDOLF ADLER, OF KARLSBAD, CZECHOSLOVAKIA

STERILIZING OF WATER

No Drawing. Application filed June 11, 1928, Serial No. 284,678, and in Czechoslovakia June 13, 1927.

A process for sterilizing water has already been proposed, which consists in this that gaseous chlorine or chlorine dissolved in water is added continuously in excess to the water which is in a continually moving stream, and the latter is then allowed to flow through porous bodies resistant to chlorine, which retard or obstruct the course of the germs in the water, relatively to the velocity at which the water flows through the porous bodies, whereupon the water, in which the germs are destroyed, but in which an excess of free chlorine is still contained, is allowed to flow over granular or otherwise formed materials, consisting essentially of carbon, which effect the quantitative conversion of the free chlorine into the chlorine ion, during the passing through of the water. It was mentioned in this connection that in the case of types of carbon with a large surface formation—as is the case for instance with the active carbons—the conversion of the free chlorine into the chlorine ion takes place particularly rapidly. It was then found subsequently that in place of free chlorine, other compounds containing or splitting off active chlorine, such as for instance the hypochlorites, behave similarly. The measure employed for removing the excess of free or active chlorine is based upon the property of carbon, hitherto not described in literature, of converting free or active chlorine very rapidly into the chlorine ion in the presence of water, in which case the carbon is oxidized to carbon dioxide.

In the case of the process referred to above it was also stated, that for removing any accumulation of suspended matter by the porous body, upon occasion and when required, water is allowed to pass in a direction in opposition to the normal course through the porous body. Provision was also made for hot water, hot air or vapour to be led at times through the carbon-containing material, in order to destroy any germs retained in the zone of the carbon material freed from free or active chlorine, or eliminate any other absorbed volatile materials.

In carrying out the aforementioned process, it has been found that in the case of certain waters, containing iron, manganese or other heavy metal salts, various disturbances may occur which manifest themselves in that when a water of this kind, which has been treated with free or active chlorine, passes through the carbon material, the latter may adsorb the said heavy metal salts. By this means the active surface of the carbon, in which the free or active chlorine is converted into the chlorine ion, liberating carbon dioxide, is reduced, which may affect the satisfactory carrying out of the process.

Of the heavy metal salts which come into question in water, it is mainly the iron and manganese salts which may cause the said drawback. The iron salts occur for the most part in the water in the ferrous oxide form, but also in many instances in organic compounds, for instance as iron humate. By the addition of free or active chlorine to the water the ferrous oxide salts are fairly rapidly converted into the ferric salts, which are for the most part split hydrolytically and precipitate as ferric hydroxide or basic ferric salts. The organic iron compounds are decomposed in view of the large excess of free or active chlorine; the ferric chloride thus formed is then also subjected to hydrolytic dissociation. The manganous salts contained in the water are in the case of a high carbonate content oxidized by free or active chlorine into the hydrate of manganese dioxide.

In so far as a complete precipitation of the said heavy metal salts takes place, the latter are of course retained by the porous body; the deposited precipitates can then be removed if desired by rinsing. The portion of the heavy metal salts however, which remains dissolved in the water in an unchanged or colloidal form and therefore passes through the porous body, reaches the carbon material, is adsorbed thereby during the passage of the water and causes the said drawbacks.

The object of the present application is to remove this drawback by allowing the water containing free or active chlorine before flowing through the carbon-containing mass, to pass over bodies resistant to free or active chlorine and insoluble in water, which bodies have the capacity of precipitating or retaining on their surface the said heavy metal salts, more especially iron and manganese salts, in the presence of free or active chlorine. Manganese peroxide or manganous acid can be mentioned chiefly as materials coming into question for this purpose. Other substances such as for instance many metallic oxides, more especially ferric oxide, and to a smaller extent also the carbonates of the alkaline earths also show this property. These substances which occur in nature or are artificially produced can be used in a pulverulent, granular or artificially prepared state or also precipitated on solid bodies (such as for instance on sand, pumice stone, tuff, natural or artificial zeolite). These substances may either be used alone and then when the size of the grains is suitably chosen, serve at the same time, if desired, to obstruct the passage of the germs or they can be used mixed with the porous body intended to obstruct the passage of the bacilli; finally the porous body can also be used before or after the said substances employed for precipitating the dissolved metal salts.

Whatever kind of arrangement is chosen, it is fundamentally and without exception necessary that during the entire passage of the water, a large excess of free or active chlorine shall remain in the water flowing through the substances precipitating the said metal salts or the porous body which is provided if desired at the same time, which excess corresponds with complete reliability on the one hand to the consumption of chlorine by the inorganic and organic substances which use of chlorine and is in addition sufficient to kill all germs and other micro-organisms. This excess of free or active chlorine must therefore also still be presen in the water when it flows out of the said substances and out of the porous body which may be provided; this excess of chlorine is only quantitatively removed owing to the conversion of the free or active chlorine into the chlorine ion during the passage of the water which is now free from living bacilli and heavy metal salts, through the carbon-containing mass.

The heavy metal compounds originating from the water and precipitating on the said substances or retained by the same will, owing to the oxidizing action of the free or active chlorine which is always present, precipitate in the higher oxidation stage (for instance as ferric hydroxide, hydrate of manganese peroxide and the like). As soon as the amount of precipitated metal compounds has reached a point which would affect the permeability as far as the water is concerned, water is allowed to flow through in opposition to the normal direction of flow and by this partial washing away of the preciptated metal compounds, the substances intended for precipitating the dissolved heavy metal salts are made effective again.

In carrying out the aforesaid measures it has been found that another drawback is involved, which consists as follows: By the hydrolytic dissociation of the oxidized heavy metal salts and in the precipitation of the heavy metal salts upon the said substances, the acid combined with the heavy metal and corresponding to the anion is set free, which increases the hydrogen ion concentration. For instance owing to the oxidizing action of the chlorine and the hydrolytic splitting, ferric hydroxide with carbonic acid is formed from ferrous bicarbonate, ferric hydroxide and sulphuric acid from ferrous sulphate and the same acids with manganese hydroxide from the analogous manganese salts. By increasing the hydrogen ion concentration however, the erosive action of pure water upon the water pipe system is increased. To avoid this drawback it has been found advisable either to incorporate acid-binding substances such as for instance limestone, chalk, marble, bauxite and the like with the mass consisting essentially of carbon or to allow the water to flow over such substances after passing through the carbon material.

The foregoing process also provides a means of preventing the growth of iron and manganese bacteria which occurs in the pipe system and frequently leads to great calamities. As proved by H. Molisch ("Die Eisenbakterien", Jena 1910, page 75) the growth of these fungi depends, even in the possible absence of inorganic iron and manganese compounds, upon the presence of organic substances, more especially of organic iron compounds. According to the present process it is possible without any difficulty by a suitably high addition of an excess of free or active chlorine, on the one hand to kill all germs or spores, and on the other hand to reduce the content of inorganic iron and manganese salts and the said organic substances to such an extent as to preclude the conditions for the growth of iron and manganese bacteria.

What we claim is:—

1. A process for sterilizing water by means of chlorine comprising first passing the chlorine containing water over substances which cause the heavy metal compounds dissolved in the water to separate out and thereupon over carbon in sufficient quantity to quantitatively and continuously convert the excess of chlorine into the chlorine ion.

2. A process for sterilizing water by means of chlorine comprising first passing the chlorine containing water over sand admixed with substances which cause the heavy metal compounds dissolved in the water to separate out and thereupon over carbon in sufficient quantity to quantitatively and continuously convert the excess of chlorine into the chlorine ion.

3. A process for sterilizing water by means of chlorine comprising first passing the chlorine containing water over sand, then over substances which cause the heavy metal compounds dissolved in the water to separate out and thereupon over carbon in sufficient quantity to quantitatively and continuously convert the excess of chlorine into the chlorine ion.

4. A process for sterilizing water by means of chlorine comprising first passing the chlorine containing water over substances which cause the heavy metal compounds dissolved in the water to separate out and which bind acids and thereupon over carbon in sufficient quantity to quantitatively and continuously convert the excess of chlorine into the chlorine ion.

5. A process for sterilizing water by means of chlorine comprising first passing the chlorine containing water over substances which cause the heavy metals to separate out and thereupon over carbon admixed with acid binding substances in sufficient quantity to quantitatively and continuously convert the excess of chlorine into the chlorine ion.

In testimony whereof we have signed our names to this specification.

OSCAR ADLER.
RUDOLF ADLER.